United States Patent [19]

Mozumder et al.

[11] Patent Number: 5,526,293

[45] Date of Patent: Jun. 11, 1996

[54] SYSTEM AND METHOD FOR CONTROLLING SEMICONDUCTOR WAFER PROCESSING

[75] Inventors: Purnendu K. Mozumder, Plano; Gabe G. Barna, Richardson both of Tex.

[73] Assignee: Texas Instruments Inc., Dallas, Tex.

[21] Appl. No.: 169,865

[22] Filed: Dec. 17, 1993

[51] Int. Cl.$^6$ .................................................. G05B 13/04
[52] U.S. Cl. .......................... 364/578; 364/468; 364/552; 364/151
[58] Field of Search ..................................... 364/468, 550, 364/552, 488, 489, 490, 491, 148, 149, 150, 151, 500

[56] References Cited

U.S. PATENT DOCUMENTS 5,347,460  9/1994  Gifford et al. ........................... 364/468

OTHER PUBLICATIONS

B. J. Mandel. The Regression Control Chart. *Journal of Quality Technology*, 1(1):pp. 1–9, Jan. 1969.

B. Bombay and C. J. Spanos. Application of Adaptive Equipment Models to a Photolithographic Process. In *SPIE Proceedings: Process Module Metrology, Control and Clustering*, vol. 1594, pp. 277–284, California, Sep. 1991.

Costas J. Spanos, Hai–Fang Guo, and Joanne Levine–Parril. Real–Time Statistical Process Control Using Tool Data. *IEEE Transactions on Semiconductor Manufacturing* pp. 308–318, Nov. 1992.

K. K. Lin and C. J. Spanos, Statistical Equipment Modeling for VLSI Manfacturing: An Application for LPCVD. *IEEE Transactions on Semiconductor Manfacturing*, 3(4):216–229, Nov. 1991.

*Primary Examiner*—Emanuel T. Voeltz
*Assistant Examiner*—Edward Pipala
*Attorney, Agent, or Firm*—William B. Kempler; Richard L. Donaldson

[57] ABSTRACT

A system (10) for run-to-run control of semiconductor wafer processing is provided. An input/output device (12) receives a desired quality characteristic for a particular semiconductor fabrication process. A generating circuit (22) uses a model to generate appropriate process parameters for a processing unit (20) and an expected quality characteristic. An adjusting circuit (16) functions to adjust process parameter inputs of the processing unit (20). In-situ sensor (18) functions to measure a quality characteristic of the process in the processing unit (20) on a real-time basis. A comparing circuit (24) functions to compare the measured quality characteristic with the expected quality characteristic. A model adjusting circuit (26) may adjust the model of the generating circuit (22) if the measured quality characteristic varies from the expected quality characteristic by more than a predetermined statistical amount.

20 Claims, 2 Drawing Sheets

SYSTEM AND METHOD FOR CONTROLLING SEMICONDUCTOR WAFER PROCESSING

NOTICE

The United States Government has a paid-up license in this invention and the right in limited circumstances to require the patent owner to license on reasonable terms as provided for by the terms of Contract No. F33615-88-C-5448 awarded by the Air Force Wright Laboratory and the DARPA Microelectronics Technology Office.

CROSS REFERENCE TO RELATED APPLICATIONS

The following application is related to the present application and is incorporated by reference herein:

U.S. Ser. No. 08/166,126, "SYSTEM AND METHOD FOR MONITORING AND EVALUATING SEMICONDUCTOR WAFER PROCESSING"

TECHNICAL FIELD OF THE INVENTION

This invention relates in general to integrated circuits. More particularly, this invention relates to a system and method for controlling semiconductor wafer processing.

BACKGROUND OF THE INVENTION

A semiconductor device may be fabricated on a semiconductor wafer having a semiconductor substrate using a variety of processing steps. Etching is a commonly-used process. Etching involves removal of material from the semiconductor substrate and/or selected thin film layers which were previously deposited on the surface of the semiconductor substrate. For example, a chemical in a plasma state may be used to etch selected portions of a nitride layer deposited on a semiconductor wafer.

The rate at which a layer of material, such as a nitride layer, is removed depends on a combination of process parameters such as, for example, RF power, gas flow rates and pressure within a reaction chamber. Each of these process parameters may vary slightly on a run-to-run basis. This may cause unacceptable changes in the etch rate. If the etch rate increases, the etch process may remove too much material. Alternatively, if the etch rate decreases, the etch process may not remove enough material.

The rate at which a layer of material is removed from a semiconductor wafer may not be uniform over the entire surface area of the layer. Consequently, etching a nitride layer with a non-uniform etch rate may cause one of two potential problems. First, the etch process may remove more than just the nitride layer at various points on the wafer. Alternatively, portions of the thin nitride layer may remain after the etch process is complete.

Existing systems and methods for run-to-run control of semiconductor processing are time consuming. Using existing systems and methods, a wafer must be completely processed, measured and the results evaluated before the process parameters may be adjusted to correct the etch process for the next run. Existing systems and methods use ex-situ sensors to measure quality characteristics to provide run-to-run control of the etch process.

SUMMARY OF THE INVENTION

In accordance with the present invention, a system and method for controlling semiconductor wafer processing is provided which substantially eliminates or reduces disadvantages and problems associated with prior systems and methods. More particularly, one embodiment of the present invention provides a system for run-to-run control of a semiconductor processing unit. Specifically, a user may supply a desired quality characteristic to the system. A generating circuit receives the supplied quality characteristic and generates process parameters and an expected quality characteristic using a predetermined model. An adjusting circuit receives the generated process parameters and adjusts selected inputs of the processing unit to process a semiconductor wafer. An in-situ sensor measures a predetermined quality characteristic of the process. A comparing circuit compares the measured quality characteristic with the expected quality characteristic. Finally, a model adjusting circuit may adjust the model if the measured quality characteristic varies from the expected quality characteristic by more than a predetermined statistical amount.

A technical advantage of the present invention inheres in the fact that the input to the system is the desired quality characteristic rather than process parameters such as gas flow rates and RF power. The system of the present invention generates the required process parameters based on the desired quality characteristics using a predetermined model for the processing unit.

Another technical advantage of the present invention inheres in the fact that it may use real-time sensing to provide run-to-run control over quality characteristics of a semiconductor fabrication process even if the desired quality characteristics are varied on a run-by-run basis. The invention utilizes model-based statistical quality control. The system of the present invention compares the expected quality characteristics with the desired quality characteristics. The expected quality characteristics are generated using one or more models. The actual quality characteristics are measured using appropriate in-situ sensors.

Another technical advantage of the present invention inheres in the fact that it allows simultaneous control of multiple quality characteristics. A user may input several quality characteristics. The system of the present invention generates process parameters that are consistent with each of the desired quality characteristics. Additionally, if one or more measured quality characteristic varies from the expected quality characteristic by more than a predetermined amount, the system of the present invention adjusts the appropriate models and generates appropriate process parameters to meet the desired quality characteristics on the next run.

Another technical advantage of the present invention inheres in the fact that it may detect and compensate for changes in expected performance of the processing equipment. The present invention may detect changes in equipment performance by comparing expected quality characteristics with measured quality characteristics. Based on this comparison, the system may compensate for changes in equipment performance by adjusting the model to more accurately reflect the actual results achieved by previous equipment settings. Subsequently, the adjusted model may be used to produce process parameters that result in measured quality characteristics that are closer to the expected quality characteristics.

BRIEF DESCRIPTION OF THE DRAWINGS

For a more complete understanding of the present invention, and the advantages thereof, reference is now made to the following description taken in conjunction with the accompanying drawings, in which like reference numbers indicate like features and wherein.

DETAILED DESCRIPTION OF THE INVENTION

Figure 1:
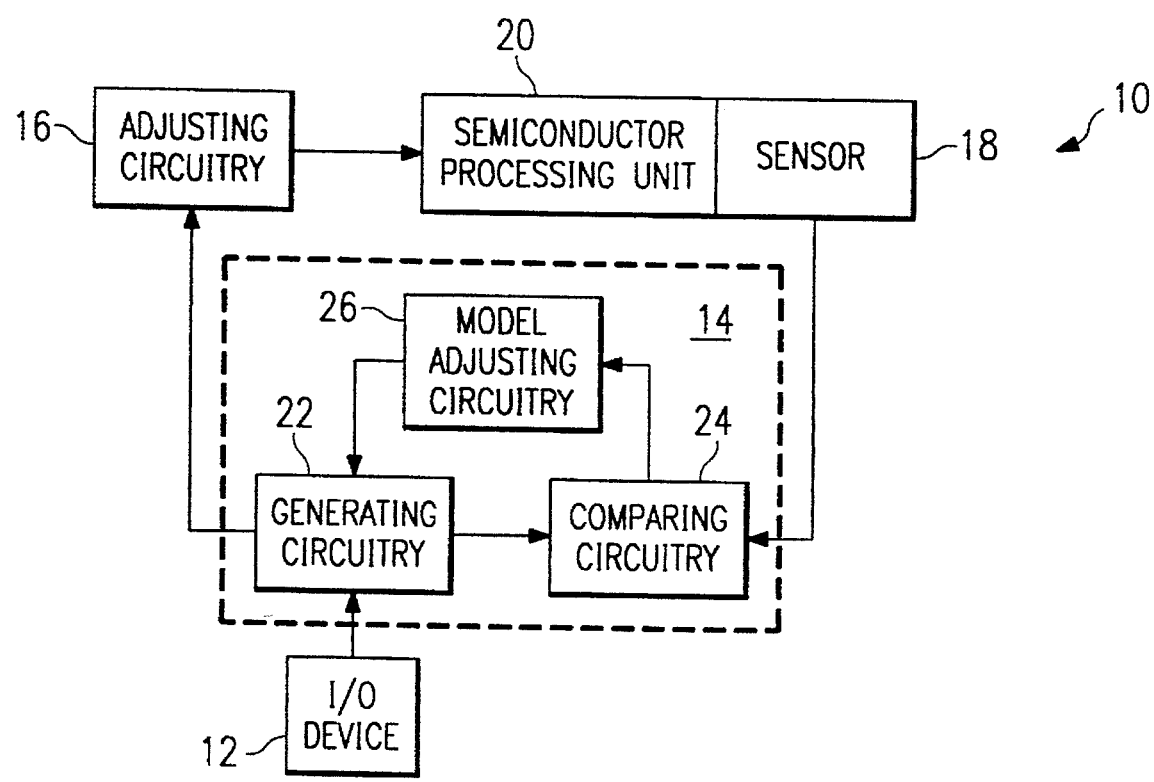
FIG. 1 illustrates a system for processing a semiconductor wafer constructed according to the teachings of the present invention.

FIG. 1 illustrates a system indicated generally at 10 for processing a semiconductor wafer and constructed according to the teachings of the present invention. System 10 operates by accepting one or more desired quality characteristics supplied by a user. These quality characteristics are commonly referred to as the equipment outputs for a process. However, system 10 accepts these desired outputs as inputs to system 10. Therefore, hereinbelow, the quality characteristics may be referred to as desired, or input quality characteristics. The input quality characteristics may comprise, for example, a desired etch rate, etch rate uniformity, and line width for a specific process. System 10 is a model-based system that generates process parameters based on the desired quality characteristics supplied by the user. For example, system 10 may generate process parameters such as RF power, reactor pressure, and gas flow rates to achieve the desired quality characteristics. Additionally, system 10 may use a feedback loop to modify the model and to control equipment settings on a real-time, run-by-run basis.

System 10 comprises input/output device 12, controlling circuitry 14, adjusting circuitry 16, in-situ sensor 18, and processing unit 20. Controlling circuitry 14 further comprises generating circuitry 22, comparing circuitry 24 and model adjusting circuitry 26. Controlling circuitry 14 may comprise, for example, a microprocessor-based computer having a read-only memory programmed to perform the functions of generating circuitry 22, comparing circuitry 24 and model adjusting circuitry 26 as described more fully below.

System 10 processes a semiconductor wafer in processing unit 20 based on data supplied by a user. System 10 receives the data through input/output device 12. Input/output device 12 may comprise, for example, a keyboard and a display screen or other appropriate device for receiving input to system 10. Input/output device 12 may receive information related to one or more desired quality characteristics. For example, input/output device 12 may receive a target value and an acceptable range for each quality characteristic. Additionally, input/output device 12 may receive an initial model for each quality characteristic to be monitored in system 10. Each model relates a desired quality characteristic to the process parameters for processing unit 20. Each model may comprise, for example, a response surface model generated by a series of designed experiments. By way of example and not by way of limitation, each model may comprise a polynomial having a constant term of the form shown in Equation (1).

$$Q = K + \sum_{i=1}^{n} A_i P_i + \sum_{i=1}^{n} B_i P_i^2 + \ldots \qquad (1)$$

In Equation (1), Q represents the desired quality characteristic, K is a constant term, $A_i$ and $B_i$ are coefficients, $P_i$ is a value of a process parameter and n is the number of process parameters for system 10. Equation (1) may be a quadratic equation. Alternatively, terms raised to higher powers may be used. Initially, K may be set to zero. Thereafter, the value of K for each model may be varied as described below to compensate for changes in equipment performance of processing unit 20. Alternatively, one of the coefficients of Equation (1), $A_i$ and $B_i$, may be varied for each model.

Input/output device 12 is coupled to generating circuitry 22 of controlling circuitry 14. Furthermore, generating circuitry 22 may generate process parameter settings for processing unit 20. Generating circuitry 22 may, for example, use a software program called NPSOL that is commercially available from Stanford University of Palo Alto, Calif. to generate to process parameters. Generating circuitry 22 stores the models supplied to input/output device 12 in a memory. An output of generating circuitry 22 is coupled to adjusting circuitry 16. Adjusting circuitry 16 is coupled to each input of processing unit 20. Adjusting circuitry 16 may comprise, for example, a plurality of actuating devices operable to adjust the inputs of processing unit 20 according to the process parameters generated by generating circuitry 22. Processing unit 20, may comprise, for example, an appropriate plasma etch reactor.

System 10 uses the output of adjusting circuitry 16 to process a semiconductor wafer in processing unit 20. During the process, sensor 18 functions to measure one or more actual quality characteristics of the process. Sensor 18 may comprise, for example, a sensor as described in applicant's co-pending application Ser. No. 08/166,126, entitled "System and Method for Monitoring and Evaluating Semiconductor Wafer Processing", which is incorporated herein by reference. Alternatively, sensor 18 may comprise any appropriate in-situ sensor that is operable to provide real-time measurement of quality characteristics of a semiconductor fabrication process. For example, sensor 18 may comprise an appropriate critical dimensions sensor. The output of sensor 18 is coupled to comparing circuitry 24 of controlling circuitry 14. Generating circuitry 22 is also coupled to comparing circuitry 24. Generating circuitry 22 supplies the predicted quality characteristics to comparing circuitry 24. Comparing circuitry 24 functions to compare the measured quality characteristic with the expected quality characteristic as described below.

System 10 may adjust the model of generating circuitry 22 if the equipment settings output by the model begin to produce quality characteristics that are statistically unacceptable as described below. The output of comparing circuitry 24 is provided to model adjusting circuitry 26. Model adjusting circuitry 26 is also coupled to generating circuitry 22. Model adjusting circuitry 26 may function to adjust a constant or coefficient of the model of generating circuitry 22 if the measured quality characteristics vary from the expected quality characteristics by more than a predetermined statistical amount. By way of example and not by way of limitation, the statistical comparison may be accomplished according to standard Western Electric Company rules (WECO rules), a cumulative sum process (CUSUM), or any other appropriate statistical method.

In operation, a user may supply one or more desired quality characteristics to system 10 through input/output device 12. Generating circuitry 22 uses the input quality characteristics to generate process parameters and expected quality characteristics. Adjusting circuitry 16 functions to adjust the process parameters of processing unit 20 based on the generated process parameters from generating circuitry 22. Processing unit 20 processes a semiconductor wafer using the process parameters from adjusting circuitry 16. Sensor 18 functions to measure the quality characteristics of the fabrication process in processing unit 20.

Comparing circuitry 24 determines whether there is a statistically significant deviation between the measured quality characteristics and the expected quality characteristics. For example, comparing circuitry 24 may use model-based statistical quality control to determine whether the measured quality characteristic is acceptable. According to this technique, the expected quality characteristic is subtracted from the measured quality characteristic to generate a difference value. To prevent the system from overacting to an unacceptable quality characteristic, the difference value may be averaged with between two and eight difference values for previous wafers. The averaged difference value may be compared with an experimentally derived standard deviation to determine whether the deviation between the expected quality characteristic and the measured quality characteristic is statistically significant. The use of a difference value allows statistical quality control on a run-to-run basis even if the desired quality characteristics change from run-to-run.

Model adjusting circuitry 26 may modify the model of generating circuitry 22 in response to the output of comparing circuit 24. Model adjusting circuitry 26 uses the difference between the measured quality characteristic and the expected quality characteristic to determine an appropriate update to the model. Model adjusting circuitry 26 may use data from, for example, up to twenty-five previous wafers. For each wafer, model adjusting circuitry 26 may determine the difference between the measured quality characteristic and the expected quality characteristic. Model adjusting circuitry 26 may, for example, weight the difference values using a predetermined weighing scheme to generate an update for the value of a constant term of the model. For example, model adjusting circuitry 26 may give the data exponentially decreasing weight. Thereby, the difference values are weighted such that the most recent difference values are given more priority because they are more representative of how system 10 is currently functioning. Finally, if the model has been adjusted during processing of one of the last twenty-five wafers, the previous adjustment to the model should be taken into account in determining how to adjust the model due to the current state of system 10.

Figure 2:
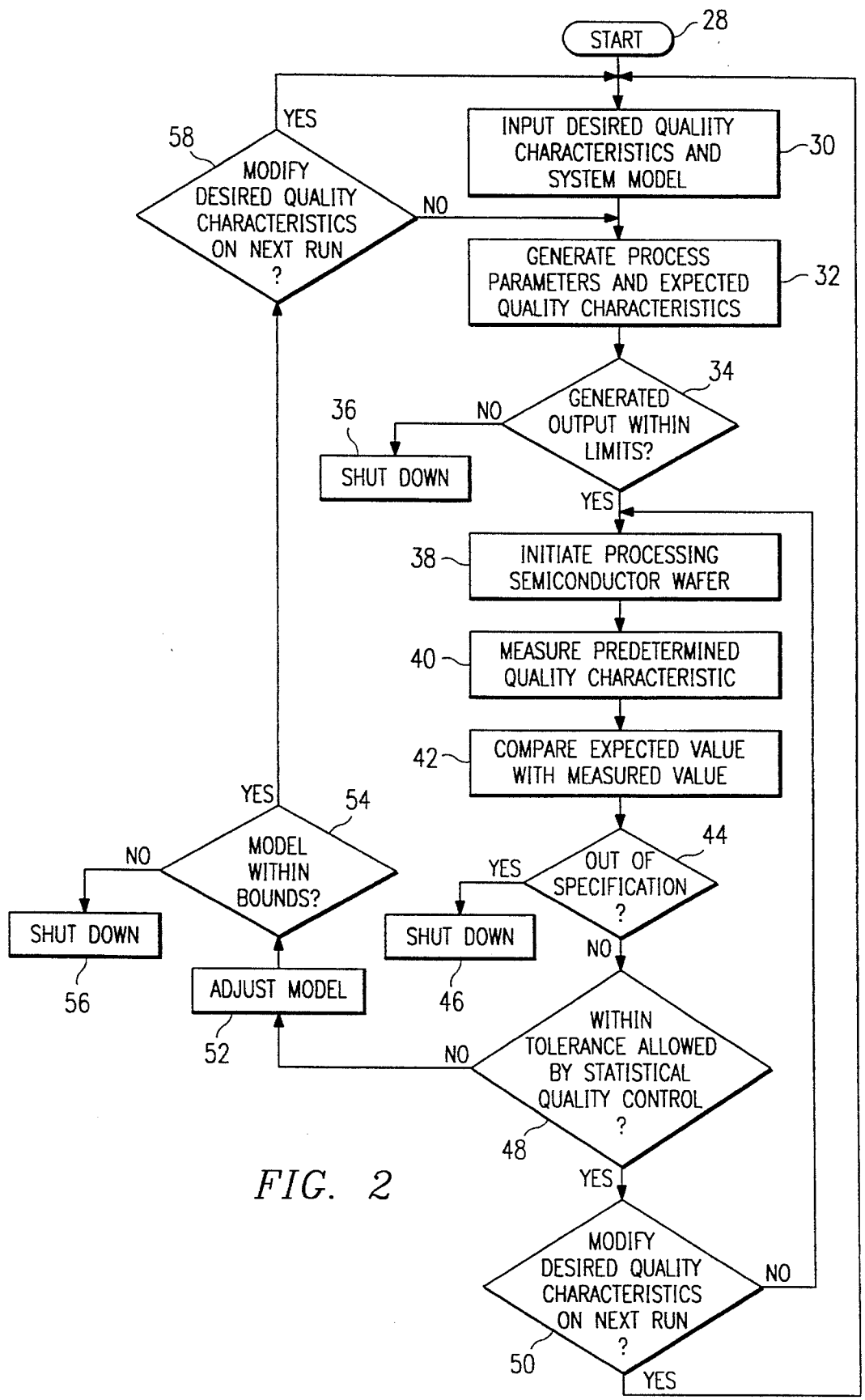
FIG. 2 is a flow chart illustrating a method for controlling semiconductor wafer processing according to the teachings of the present invention.

FIG. 2 illustrates a method for processing a semiconductor wafer according to the teachings of the present invention. The method of FIG. 2 begins at block 28. At block 30, desired quality characteristics and a system model may be input into system 10 at input/output device 12. At block 32, system 10 generates process parameters and predicted quality characteristics in generating circuitry 22. At block 34, a decision is made in generating circuitry 22 as to whether generating circuitry 22 was able to generate appropriate process parameters to achieve the desired quality characteristics. The answer at block 34 is no if generating circuitry 22 was unable to select appropriate process parameters. Furthermore, the answer at block 34 is no if generating circuitry 22 was unable to achieve one or more input desired quality characteristic. If the answer is no, the method proceeds to block 36 and system 10 is shut down. If the answer is yes, the system proceeds to block 38.

At block 38, system 10 initiates processing and fabrication of the semiconductor wafer in processing unit 20. Adjusting circuitry 16 supplies appropriate process parameter inputs to processing unit 20. Sensor 18 of system 10 measures predetermined quality characteristics at block 40. At block 42, the measured value of the quality characteristics is compared with the expected value of the quality characteristics in comparing circuitry 24. At block 44, a determination is made as to whether the difference between the expected quality characteristics and the measured quality characteristics is beyond the ability of controlling circuitry 14 to correct. If the answer is yes, the method proceeds to block 46 and system 10 is shut down. If, however, the answer is no, the method proceeds to block 48.

At block 48, a decision is made as to whether the difference between the expected and predicted quality characteristics is within a tolerance allowed by statistical quality control. If the answer is yes, the method proceeds to block 50. At block 50, a decision is made as to whether the system operator desires to modify the desired quality characteristics for the next semiconductor wafer to be processed by system 10. If the answer is no, the method returns to initiate processing at block 38. If, however, the answer is yes, the method returns to block 30.

At block 48, if the method determines that the difference between the expected and measured quality characteristics is not within the tolerance allowed by statistical quality control, the method proceeds to block 52. At block 52, model adjusting circuitry 26 may adjust a constant or coefficient of the model of generating circuitry 22. At block 54, a decision is made as to whether the modified model of generating circuitry 22 are within predetermined limits. If the answer is no, the method proceeds to block 56 and system 10 is shut down. If, however, the answer is yes, the method proceeds to block 58. At block 58, a decision is made as to whether the user will modify the desired quality characteristics for the next semiconductor wafer. If the answer is no, the method returns to block 32. If, however, the answer is yes, the method returns to block 30.

Although the present invention has been described in detail, it should be understood that various changes, substitutions and alterations can be made hereto without departing from the spirit and scope of the invention as defined by the appended claims. For example, various statistical models may be used with system 10 that are operable to relate a quality characteristic to the process parameters of a system. Additionally, the teachings of the present invention may apply to semiconductor fabrication processes other than plasma etch processes. For example, the teachings of the present invention may apply equally to a process for depositing an oxide layer on a semiconductor substrate, or any other processing operation in which an in-situ sensor may measure a quality characteristic of the process.

What is claimed is:

1. A system for run-to-run control of a semiconductor processing unit, comprising:

a generator operable to generate process parameters using a model which provides a transfer function from said progress parameters to a quality characteristic provided by a user;

circuitry responsive to said generator and operable to adjust selected inputs of the processing unit to process a semiconductor wafer using said generated process parameters;

an in-situ sensor comprising an optical device operable on a single wavelength to generate a signal proportional to the concentration of a predetermined chemical species present during processing of the wafer for measuring a quality characteristic of said process in real-time during said process;

a comparator responsive to said sensor and said generator and operable to compare said measured quality characteristic with said quality characteristic; and circuitry responsive to said comparator and operable to adjust said model if said measured quality characteristic varies from said expected quality characteristic by more than a predetermined statistical amount.

2. The system of claim 1, and further comprising an input/output device for receiving said quality characteristic from the user.

3. The system of claim 1, wherein said adjusting circuitry comprises a plurality of actuating devices operable to adjust selected process parameter inputs of the processing unit.

4. The system of claim 1, wherein said comparator subtracts said expected quality characteristic from said measured quality characteristic to generate a difference value and averages said difference value with between two to eight difference values from previous wafers.

5. The system of claim 1, wherein said model adjusting circuitry comprises circuitry operable to adjust a constant term of said model if said measured quality characteristic varies from said expected quality characteristic by more than a predetermined statistical amount.

6. The system of claim 1, wherein said model adjusting circuitry weights the difference between said measured quality characteristic and said expected quality characteristic for the current wafer with said difference for up to twenty-five previous wafers to adjust a constant term of said model.

7. A system for run-to-run control of a semiconductor processing unit, comprising:

a generator operable to generate process parameters and an expected quality characteristic using a model and a desired quality characteristic provided by a user;

circuitry responsive to said generator and operable to adjust selected inputs of the processing unit to process a semiconductor wafer using said generated process parameters:

a real-time, in-situ sensor comprising optical device operable on a single wavelength to generate a signal proportional to the concentration of a predetermined chemical species present during processing of the wafer for measuring a quality characteristic of said process, wherein said sensor comprises:

a monochromator operable to generate said signal proportional to the concentration of a predetermined chemical species present during processing of the wafer;

a storage responsive to said monochromator and operable to store a value of said signal at predetermined intervals during the processing to generate data representative of an optical emission trace; and circuitry responsive to said storage and operable to use a function to convert a slope at an end-point of said optical emission trace to a quality characteristic for the process;

a comparator responsive to said sensor and said generator and operatable to compare said measured quality characteristic with said expected quality characteristic; and circuitry responsive to said comparator and operable to adjust said model if said measured quality characteristic varies from said expected quality characteristic by more than a predetermined statistical amount.

8. A system for run-to-run control of a semiconductor processing unit, comprising:

a generator operable to generate process parameters using a plurality of models each of which provides a transfer function from said process parameters to at least one of a plurality of quality characteristics at least one of said characteristics being unmeasurable after said process is complete;

circuitry responsive to said generator and operable to adjust selected inputs of the processing unit to process a semiconductor wafer using said generated process parameters;

an in-situ sensor for measuring a quality characteristic of said process in real-time during said process;

a comparator responsive to said sensor and said generator and operable to compare the measured quality characteristics with the expected quality characteristics; and circuitry responsive to said comparator and operable to adjust the model if the measured quality characteristics vary from the expected quality characteristics by more than a predetermined statistical amount.

9. The system of claim 8, wherein said adjusting circuitry comprises a plurality of actuating devices operable to adjust selected process parameter inputs of the processing unit during the processing of the semiconductor wafer.

10. The system of claim 8, wherein said comparing circuitry subtracts said expected quality characteristic from said measured quality characteristic to generate a difference value and averages said difference value with between two to eight difference values from previous wafers.

11. The system of claim 8, wherein said model adjusting circuitry comprises circuitry operable to adjust a constant term of said model if said measured quality characteristic varies from said expected quality characteristic by more than a predetermined statistical amount.

12. The system of claim 8, wherein said model adjusting circuitry weights the difference between said measured quality characteristic and said expected quality characteristic for the current wafer with said difference for up to twenty-five previous wafers to adjust a constant term of said model.

13. A system for run-to-run control of a semiconductor processing unit, comprising:

a generator operable to generate process parameters and a plurality of expected quality characteristics using a plurality of models and desired quality characteristics;

circuitry responsive to said generator and operable to adjust selected inputs of the processing unit to process the semiconductor wafer using said generated process parameters;

a real-time, in-situ sensor for measuring a quality characteristic of said process wherein said sensor comprises:

a monochromator operable to generate a signal proportional to the concentration of a predetermined chemical species present during processing of the wafer;

a storage responsive to said monochromator and operable to store a value of a signal at predetermined intervals during the processing to generate data representative of an optical emission trace; and circuitry responsive to said storage and operable to use a function to convert a slope at an end-point of said optical emission trace to a quality characteristic for the process;

a comparator responsive to said sensor and said generator and operable to compare the measured quality characteristics with the expected quality characteristics;

circuitry responsive to said comparator and operable to adjust the model if the measured quality characteristics varies from the expected quality characteristics by more than a predetermined statistical amount.

14. A system for run-to-run control of a semiconductor processing unit, comprising:

a generator operable to generate process parameters and an expected quality characteristic using a model and a desired quality characteristic provided by a user;

circuitry responsive to said generating circuitry and operable to adjust selected inputs of the processing unit to process a semiconductor wafer using said generated process parameters;

a real-time, in-situ sensor for measuring a signal correlated to a quality characteristic of said process which is not measurable after the process is complete;

a comparator responsive to said sensor and said generator and operable to compare said measured quality characteristic with said expected quality characteristic;

circuitry responsive to said comparator and operable to adjust said model if said measured quality characteristic varies from said expected quality characteristic by more than a predetermined statistical amount.

15. The system of claim 14, and further comprising an input/output device for receiving said quality characteristic from the user.

16. The system of claim 14, wherein said adjusting circuitry comprises a plurality of actuating devices operable to adjust selected process parameter inputs of the processing unit.

17. The system of claim 14, wherein said comparator subtracts said expected quality characteristic from said measured quality characteristic to generate a difference value and averages said difference value with between two to eight difference values from previous wafers.

18. The system of claim 14, wherein said model adjusting circuitry comprises circuitry operable to adjust a constant term of said model if said measured quality characteristic varies from said expected quality characteristic by more than a predetermined statistical amount.

19. The system of claim 14, wherein said model adjusting circuitry weights the difference between said measured quality characteristic and said expected quality characteristic for the current wafer with said difference for up to twenty-five previous waters to adjust a constant term of said model.

20. A system for run-to-run control of a semiconductor processing unit, comprising:

a generator operable to generate process parameters and an expected quality characteristic using a model and a desired quality characteristic provided by a user;

circuitry responsive to said generator and operable to adjust selected inputs of the processing unit to process a semiconductor wafer using said generated process parameters;

a real-time, in-situ sensor for measuring a signal correlated to a non-directly observable quality characteristic of said process wherein said sensor comprises:

a monochromator operable to generate a signal proportional to the concentration of a predetermined chemical species present during processing of the wafer;

a storage responsive to said monochromator and operable to store a value of a signal at predetermined intervals during the processing to generate data representative of an optical emission trace; and circuitry responsive to said storage and operable to use a function to convert a slope at an end-point of said optical emission trace to a quality characteristic for the process;

a comparator responsive to said sensor and said generator and operable to compare said measured quality characteristic with said expected quality characteristic;

circuitry responsive to said comparator and operable to adjust said model if said measured quality characteristic varies from said expected quality characteristic by more than a predetermined statistical amount.

* * * * *